United States Patent [19]

Singewald et al.

[11] Patent Number: 5,383,952
[45] Date of Patent: Jan. 24, 1995

[54] PROCESS FOR BINDING DUST IN FERTILIZER GRANULES

[75] Inventors: Arno Singewald, Kassel-Wilhelmshohe; Otto Wendt, Wathlingen; Gunter Nürnberger, Isernhagen; Dieter Paetz, Lehrte-Ahlten; Wolfgang Walczyk, Hohenroda; Klaus-Dieter Müller, Lohfelden, all of Germany

[73] Assignee: Kali und Salz Aktiengesellschaft, Kassel, Germany

[21] Appl. No.: 210,086

[22] Filed: Mar. 16, 1994

Related U.S. Application Data

[63] Continuation of Ser. No. 656,049, Feb. 14, 1991, abandoned.

[30] Foreign Application Priority Data

Jun. 7, 1989 [DE] Germany ............................ 3918523

[51] Int. Cl.⁶ .......................... C05G 3/10; C05D 1/00
[52] U.S. Cl. ...................................... 71/63; 71/64.11; 71/64.12; 427/220; 252/384
[58] Field of Search ................ 71/64.07, 64.11, 64.12, 71/64.13, 26, 33, 63; 427/220; 252/381, 384

[56] References Cited

U.S. PATENT DOCUMENTS

| 4,252,831 | 2/1981 | Gleckler et al. ..................... 71/33 X |
| 4,689,251 | 8/1987 | Newman et al. ..................... 427/220 |

FOREIGN PATENT DOCUMENTS 7013938  3/1971  Netherlands ....................... 71/64.12

OTHER PUBLICATIONS

CA 97:129993h, 1982, Turko et al., 1, "Decreasing the Caking of Potassium Chloride".

*Primary Examiner*—Ferris Lander
*Attorney, Agent, or Firm*—Collard & Roe

[57] ABSTRACT

Dust is bound in fertilizer granules by spraying the granules with a solution of molasses and another oxygen-containing hydrocarbon from the group glycerin, polyethylene glycol and triethanolamine.

3 Claims, No Drawings

PROCESS FOR BINDING DUST IN FERTILIZER GRANULES

This is a continuation of copending application Ser. No. 07/656,049 filed on Feb. 14, 1991 and now abandoned and of International Application PCT/EP90/00797 filed on May 17, 1990 and which designated the U.S.

This invention relates to a process for preventing dusting when loading or transporting granulates or pellets, especially fertilizer granulates.

Fertilizers are increasingly being produced in granulated form and transported in loose bulk. Dry press granulation is primarily used to produce the granules, which forms the fine salt into shells from which granules are then made by crushing and resifting, preferably with a grain size range of 1.0 to 4.0 mm.

It is well known that granulation aids are added to the starting mixture for the granulation of fine-grained substances into granules.

Thus, DE-AS 21 01 585 describes the addition of binders of organic or inorganic nature such as molasses, starch, calcium chloride, or alkali metal and alkaline earth sulfates and nitrates in the compaction of phosphate fertilizer in an amount of about 2 to 3%, with specific temperature ranges and time cycles being urgently prescribed for the actual compaction and aftertreatment. DE-PS 36 18 058 describes a process for granulating water-soluble fertilizers with high proportions of pebbles, characterized by the fact that soluble and/or readily colloidally soluble substances from the class of mono-, di-, and polysaccharides and/or their simple hydrophilic derivatives are added to the granulation product in solid form or as a solution in an amount between 0.1 and 5%; also sucrose in solid form or as high-sugar molasses.

The granules produced by this method, above all because of the subsequent crushing process, have sharp corners and edges that are rubbed off during the transport or packaging of the product and produce undesirable dusting during transport and further use, which results in intolerable environmental pollution. It is known that it is being attempted to counteract this phenomenon by screening out extremely fine particles before loading by the producer. However, experience has shown that this aftertreatment alone is not sufficient to remove the adhering residual fine dust or to improve the abrasion resistance of the edges, corners, and even faces of the granule particles.

A process is disclosed by DD-PS 136 956 for improving the abrasion resistance of potash fertilizer granules by subjecting the potash fertilizer after the granulating process to an aftertreatment after dedusting in a fluidized bed, that consists of a subsequent treatment of the granule surface with water or aqueous additives, followed by drying and cooling of the granulated substance thus treated. The process is based on the ability to eliminate unstable tips or edges that are still present by etching and recrystallization, and thus strengthening the granule surface. DE-OS 30 03 883 supplements the aforementioned patent application by establishing a temperature range of 80°-100° C. at which an optimal strength gain is said to be produced according to the OS, when a minimum residence time of 10 seconds in a high-humidity atmosphere is provided for at the same time.

The described method of treatment requires great expense for the installations following the actual granulation and screening, and can be used only directly by the producer, since the heat necessary for the process originates from the granule production. Therefore, for example, completely aside from the investment expense and the maintenance costs occasioned by it, this method cannot be used for granulated potash products that have to be stored for a long time in intermediate stocks and loaded again from there. It is well known that lengthy storage time and the physical effects associated with it such as storage pressure and changes of humidity can have negative effects on granules treated in this way (tendency toward caking). be sprayed to produce good distribution during the application at about 80° C.

The long storability of the product treated in this way can be attributed to the long-acting dust-binding power of the dust-binding mixture pursuant to the invention.

A preferred mixture (dust-binding mixture) consists of molasses and at least one other water-soluble hydrocarbon containing oxygen. The mixture is added to the granules in extremely finely divided form.

The molasses assumes the adhesive action and thus the binding of dust, while the second organic substance keeps the dust-binding mixture deposited on the granulate as a film moist and thus active by controlling the water vapor pressure of the solution.

Molasses, which is especially suitable, is produced as the second crude sugar step in the production of cane sugar. As the second organic substance, water-soluble hydrocarbons containing oxygen are found in the group consisting of glycerin, polyethylene glycol, and triethanolamine, either singly or as a mixture of any two of these compounds. These satisfy the requirements for a dust-binding agent to a high degree.

Any one of these substances is effective combined with molasses; any two of the three substances are mixed in a ratio of about 1:1 to special advantage. In each case, the substances glycerin, polyethylene glycol, and triethanolamine, alone or mixed, constitute at least 10% of the total quantity of the dust-binding mixture (including molasses).

The object of the invention in particular is a homogeneous mixture of molasses and the second organic substance in a ratio of 1:0.3 to 1:2.

It has been found, for example with potash fertilizer granulates, that even a small addition, specifically 0.6 to 1.2 wt. %, preferably 0.7 to 0.9 wt. % of the dust-binding mixture based on the weight of the bulk product, produces the desired optimal effect. The content of active substance ($K_{2O}$) does not fall short of the prescribed tolerance range in this application to potash fertilizer granulates.

The homogeneous mixture can be produced with no problems in a tank provided with a stirring mechanism at room temperature.

Application to the granulates subjected to the loading process and already relieved of extremely fine dust by screening can be accomplished at room temperature up to a maximum temperature of 50° C. with appropriate application of pressure and choice of nozzles.

In contrast to other purely organic nonaqueous dust-binding agents, heating is not absolutely necessary.

The dust-binding to be produced is determined by the method described below:

Samples of the granulate to be conditioned are relieved of any adhering particles by screening. The binding agent to be tested is then diffused uniformly and sprayed onto the samples of 200 g each. After application, exactly 1% of dust (<0.2 mm) of the bulk product, based on the weight of granulate, is again added., and all of the samples are mixed by rotation for five minutes in a sample bottle.

The samples thus obtained are then tested after a storage time, for example, by screening the entire contents of the sample bottle on an Alpine air-jet machine with a 0.063 mm screen inserted.

The screening time must be exactly three minutes. Then either the filter paper inserted and loaded with dust is weighed, or in case of soluble dusts such as potassium salts, for example, the dust is leached out and the amount is determined by titration. The dust-binding is calculated from this figure in percent.

In the comparison tests listed in the table below, 9 kg of binder was sprayed in each case onto one ton of potassium sulfate pressed granulate at a temperature of 45° C.

The individual chemicals were used here in the following form:

Molasses with a solids content of 47%

Glycerin (trihydroxypropane), singly distilled, 86–88% Density at 20° C.=1.23 g/cm$^3$; flash point 180° C.

Polyethylene glycol Density at 20° C.=1.13 g/cm$^3$; with an average molecular weight of 400 g/mol; flash point: <100° C.

Triethanolamine N(CH$_2$CH$_2$OH)$_3$; Density at 25° C.=1.11 g/cm$^3$; assay 85%; max. 0.5% H$_2$0; approx. 15% iminobisethanol

TABLE

| Dust Binding Relative to Blank Sample in % | | |
|---|---|---|
| | After 1 Week | After 6 Weeks |
| 1. Blank sample | 0 | 0 |
| 2. Molasses (100%) | 62 | 66 |
| 3. Glycerin (100%) | 61 | 40 |
| 4. Polyethylene glycol (100%) | 56 | 49 |
| 5. Molasses/Glycerin (1:1) | 87 | 86 |
| 6. Molasses/Polyethylene glycol (1:1) | 87 | 82 |
| 7. Molasses/Polyethylene glycol (2:1) | 89 | 87 |
| 8. Molasses/Triethanolamine (1:1) | 96 | 86 |
| 9. Molasses/Glycerin/Polyethylene glycol) (1:0.5:0.5) | 86 | 80 |
| 10. Molasses/Glycerin/Triethylanolamine (1:0.5:0.5) | 99 | 90 |
| 11. Molasses/Polyethylene glycol/ Triethanolamine (1:0.5:0.5) | 96 | 87 |

It is found that compared to an untreated sample, very good dust binding can be achieved. The individual substances alone are not as effective by far as the mixtures.

On the one hand, the mixtures act substantially more intensively and more completely, and on the other hand the effect lasts longer. High dust-binding figures are obtained even after 6 weeks.

The applied examples given below describe the invention without limiting it.

EXAMPLE 1

A potassium sulfate granulate obtained from press granulation followed by screening is stored unconditioned in a warehouse. With a product temperature of 40° C., the granulate is subjected to very fine dust screening before loading in loose bulk, and after this, it is treated with the dust-binding agent before the delivery point of the belt before entering the transport tanks; located there are fan jet atomizing nozzles that are arranged so that the delivery cloud is included on all sides by the cone of spray. After this are baffles to thoroughly mix the moistened loading product. The atomizing pressure is about 3–5 bar.

The temperature of the materials on the average is room temperature. A mixture of 50% molasses (assay 47%) and 50% glycerin (with an assay of 86% and a density of 1.23 g/cm$^3$) is used in an amount of 0.8% based on the K$_2$SO$_4$ granulate to be conditioned.

EXAMPLE 2

The granulate from the press granulation followed by screening is fed directly to the loading process. After the extremely fine dust screening carried out here also, as described under Example 1, the conditioning agent is applied in an amount of 4 kg of molasses and 4 kg of polyethylene glycol (density=1.13 and an average molecular weight=400 g/mol) per ton of granulate, but because of the temperature of the freshly produced granulate, heating the applied conditioning agent can be omitted if an atomization pressure of at least 3 to 5 bar is available.

We claim:

1. Process for preventing dusting during the loading or transporting of granulates, comprising:
    adding to said granulates a dust-binding, liquid mixture consisting of molasses and another liquid selected from the group consisting of glycerin, polyethylene glycol, triethanolamine and the mixtures thereof;
    wherein the dust-binding mixture is used in an amount of 0.6% to 1.2% by weight, based on the weight of the granulates to be treated;
    wherein the weight ratio between the molasses and the another liquid is 1:0.3 to 1:2; and
    adding said dust-binding liquid mixture in extremely finely divided form.

2. The process according to claim 1, wherein adding the dust-binding liquid mixture is by atomizing the mixture so that a delivery cloud of the mixture is included on all sides of the granulates by a cone of spray of the mixture.

3. The process according to claim 1,
    wherein the liquid mixture consists of molasses and glycerin in a weight ratio of 1:1; and
    wherein said granulates consist of a potassium salt.

* * * * *